June 9, 1959    C. H. GRISS ET AL    2,889,737
APPARATUS FOR OPTICAL INSPECTION OF GLASS SHEETS
Filed Nov. 23, 1954    5 Sheets-Sheet 1
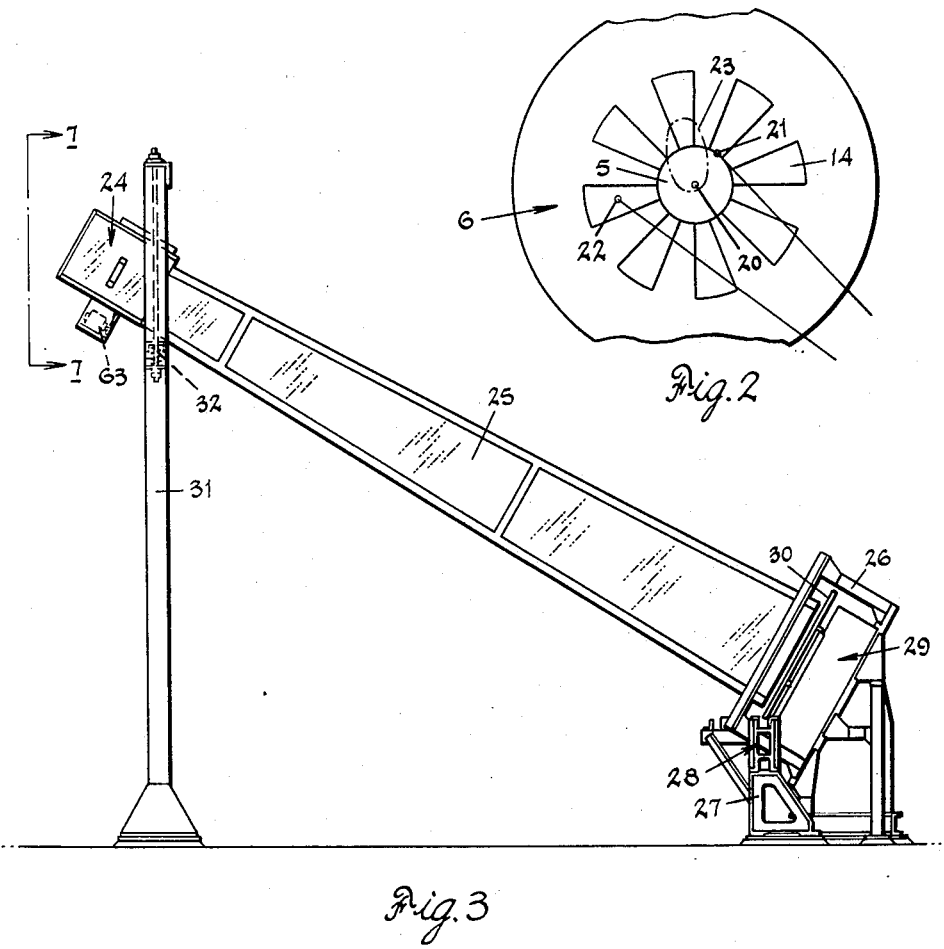
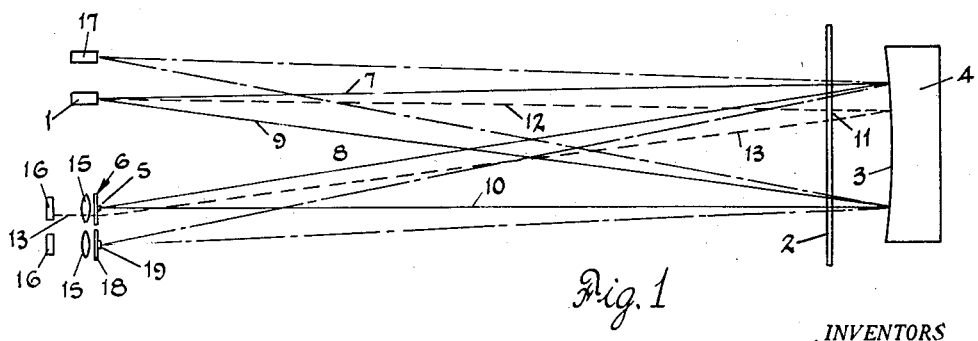
INVENTORS
Charles H. Griss and
BY Norman V. Huber
Nobbe & Swope
ATTORNEYS June 9, 1959   C. H. GRISS ET AL   2,889,737
APPARATUS FOR OPTICAL INSPECTION OF GLASS SHEETS
Filed Nov. 23, 1954   5 Sheets-Sheet 2

INVENTORS
Charles H. Griss and
BY Norman U. Huber
Nobbe & Swope
ATTORNEYS

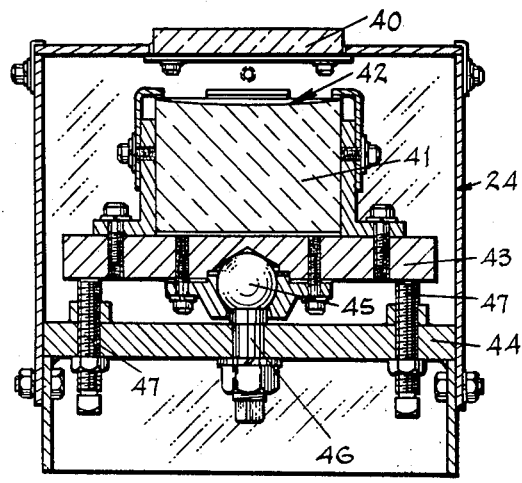
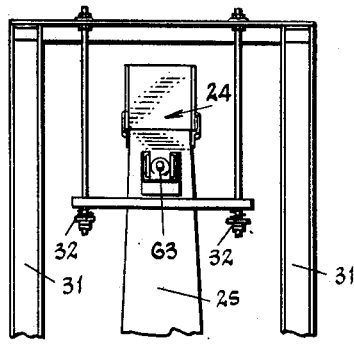
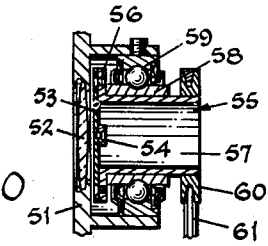
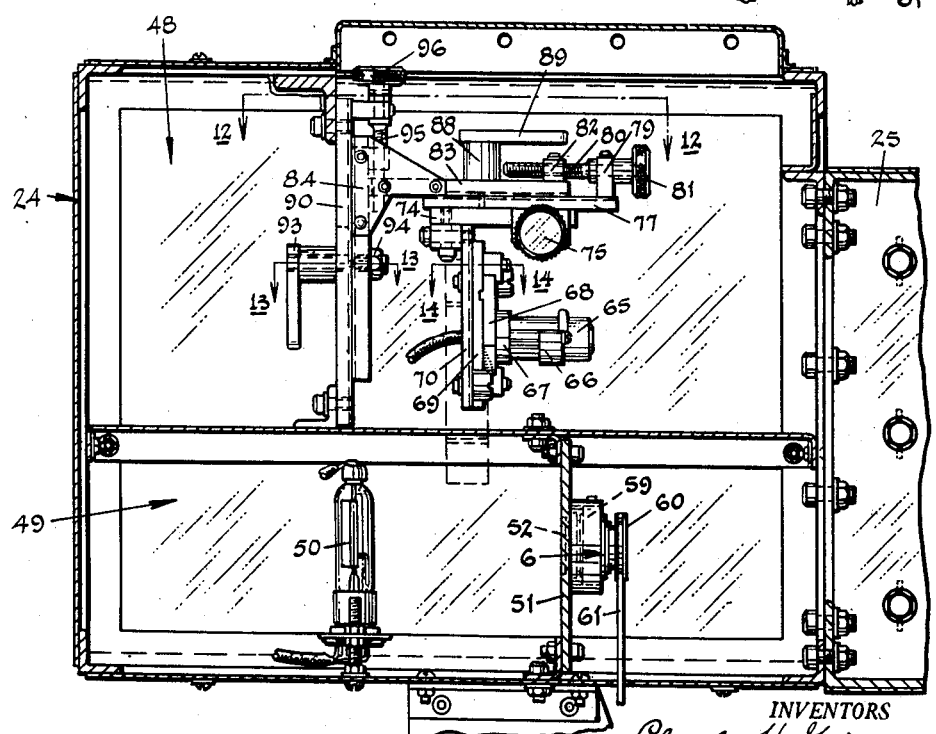

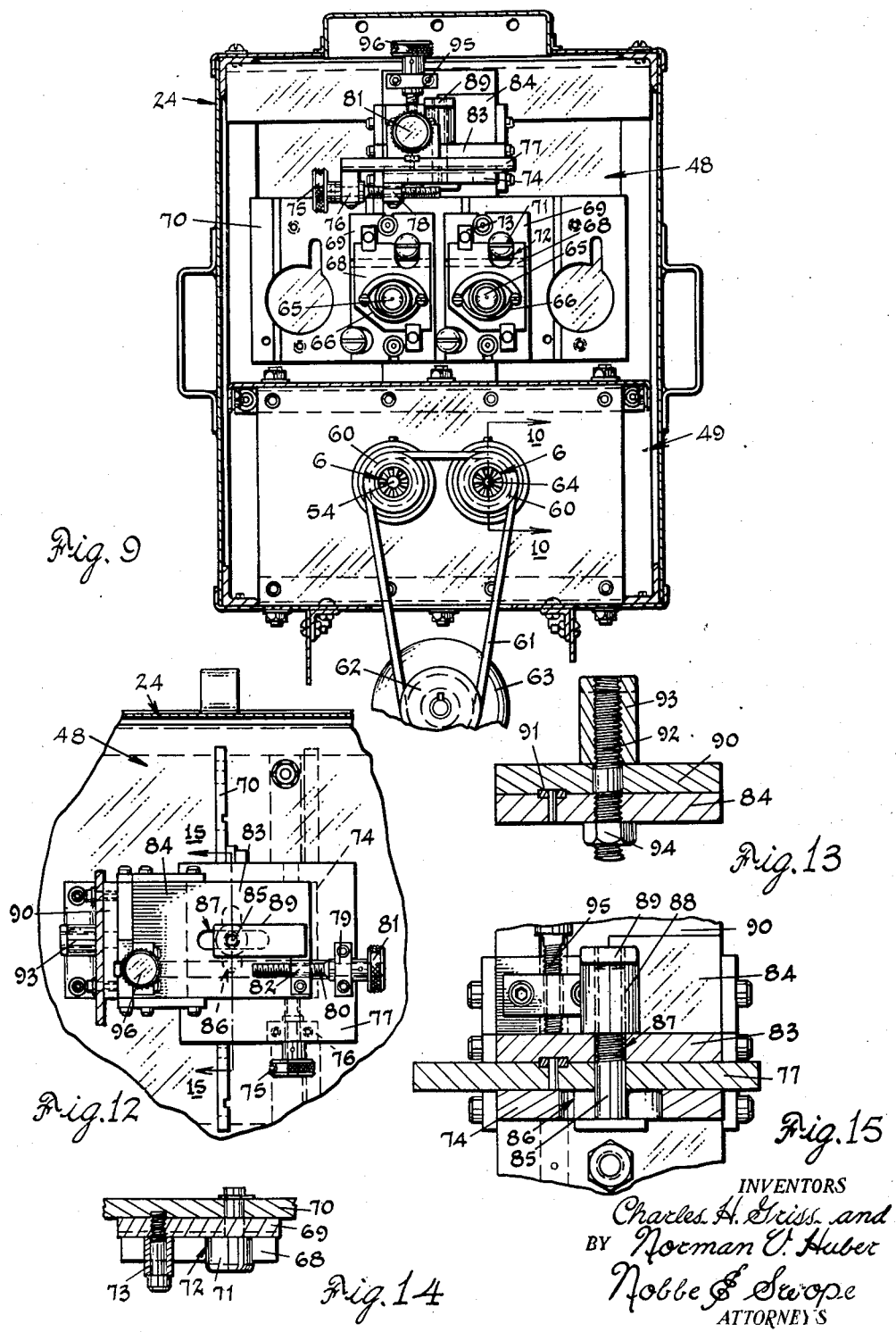

June 9, 1959  C. H. GRISS ET AL  2,889,737
APPARATUS FOR OPTICAL INSPECTION OF GLASS SHEETS
Filed Nov. 23, 1954  5 Sheets-Sheet 5

INVENTORS
Charles H. Griss and
BY Norman V. Huber
Nobbe & Swope
ATTORNEYS

United States Patent Office 2,889,737
Patented June 9, 1959

2,889,737
APPARATUS FOR OPTICAL INSPECTION OF GLASS SHEETS

Charles H. Griss, Perrysburg, and Norman V. Huber, Maumee, Ohio, assignors to Libbey-Owens-Ford Glass Company, Toledo, Ohio, a corporation of Ohio Application November 23, 1954, Serial No. 470,598

11 Claims. (Cl. 88—14)

This invention relates to improved apparatus for automatically inspecting glass sheets for optical defects that are not readily apparent to an unaided eye.

One common defect in glass sheets is lack of parallelism between the surfaces of the glass. This defect, known as "wedge," may exist uniformly throughout a sheet of glass or it may exist only in randomly located areas of greater or less extent. If a glass sheet is used as a window and it contains areas exhibiting varying amounts of wedge, any object viewed through such a window is distorted in shape and its apparent position does not coincide exactly with its actual position. Ordinarily this effect is not of sufficient magnitude to cause concern. Wedge in the glass, however, shows up if the object being viewed is a bright light source, such as the headlight of an automobile, seen against a dark background. Under this condition a piece of glass exhibiting wedge produces a ghost image that is displaced from the light source an apparent distance that varies according to the amount of wedge (the departure from exact parallelism between the glass surfaces) present in the glass. This ghost image is produced by light rays that, after entering the front surface of the glass, are reflected first from the rear surface, then from the front surface, and then emerge through the rear surface. If the two surfaces of glass are precisely parallel (no wedge), the doubly reflected ray and the directly transmitted ray of light are precisely parallel and there is no readily observable difference in position between the apparent position of the object and its actual position.

This defect in the glass sheets may be observed in the laboratory or in an inspection department by setting up similar conditions and looking for the ghost images. This method of inspection is not only tiresome but also time consuming because each small area of the glass must be individually inspected and an estimate made of the amount of wedge existing in such small area.

Apparatus for automatically inspecting sheets of glass for "wedge" is disclosed in Patent No. 2,735,331, issued February 21, 1956, to H. A. McMaster and Roy W. Wampler.

In their application, the presence of wedge causing ghost images is detected by observing the deviation caused by refraction of light passing through the glass. According to their method and apparatus, a glass sheet to be inspected is positioned in front of a concave mirror and is illuminated by a brilliant concentrated light source located near the center of curvature of the mirror. An image of the light source as focused by the mirror is received upon a small opaque screen of just sufficient area to intercept all of the undeviated rays of light. If there are areas of the glass being inspected that exhibit wedge, these areas (acting as thin prisms refracting the rays of light) produce deviations of the rays of light both when they pass through the glass going to the mirror as well as when they return from the mirror. The deviations so produced are additive and are sufficient so that the deviated rays of light miss the opaque screen and may be collected and directed toward a photoelectric cell for signalling the presence of wedge in the glass sheet being inspected.

When the deviated rays of light strike the photo-electric cell, they are converted into electrical energy and through various control means actuate a marking device adjacent the glass sheet being inspected and which serves to indicate on the surface of the glass the presence of areas exhibiting wedge.

Although this method and apparatus, generally speaking proved satisfactory, a certain amount of scattered light is constantly emitted toward and received by the photocells due to the occurrence of haze or films on the surfaces of the glass being inspected. The presence of scattered light of relatively high intensity and its striking the photocell occasionally gives an erroneous signal to the device operating the marker and therefore causes sheets of glass to be rejected not for exhibiting wedge, but rather for having surface films thereon.

Therefore, the principal object of the invention is to provide optical inspection apparatus for indicating the presence of wedge in glass to be inspected and which will not be affected by the presence of scattered light due to films or the like on the surface of the glass.

Another object of the invention is to provide automatic optical inspection apparatus that detects sheets of glass having areas of wedge therein and automatically marks such sheets as being optically defective.

Another object of the invention is to provide automatic optical inspection apparatus that will differentiate between degrees of wedge existing in glass to be inspected and cause said sheets to be marked when the degree of wedge exceeds permissible tolerances.

A further object of the invention is to provide automatic optical inspection apparatus having means for intermittently interrupting deviated rays of light caused by non-parallelism of the surfaces of a glass sheet to be inspected, and causing said intermittent rays to generate a pulsating signal receivable by a responsive device capable of indicating an area of wedge on the glass to be inspected.

Other objects and advantages of the invention will become more apparent during the course of the following description when taken in connection with the accompanying drawings.

In the drawings, wherein like numerals are employed to designate like parts throughout the same:

Fig. 1 is a diagram of the optical system employed in the improved inspection apparatus;

Fig. 2 shows a chopping device adapted to intermittently interrupt deviated light and possible locations of the focused light source images;

Fig. 3 is a side elevation of the complete inspection machine;

Fig. 6 is a section taken along the line 6—6 of Fig. 4;

Fig. 7 is a fragmentary end elevation of the upper end of the apparatus as seen from the line 7—7 of Fig. 3;

Fig. 8 is an enlarged side elevation of the light sources and light detecting apparatus located at the upper left end of the inspection machine shown in Fig. 3;

Fig. 9 is an elevation looking along the optical axis of the system toward the light sources and light detecting apparatus;

Fig. 10 is a sectional view of one of the light choppers taken along the line 10—10 of Fig. 9;

Fig. 12 is a fragmentary sectional view taken along the line 12—12 of Fig. 8;

Fig. 13 is a fragmentary section of one of the clamping means taken along the line 13—13 of Fig. 8;

Fig. 14 is a fragmentary section taken along the line 14—14 of Fig. 8;

Fig. 15 is a fragmentary section taken along the line 15—15 of Fig. 12; and

Figures 4, 5:
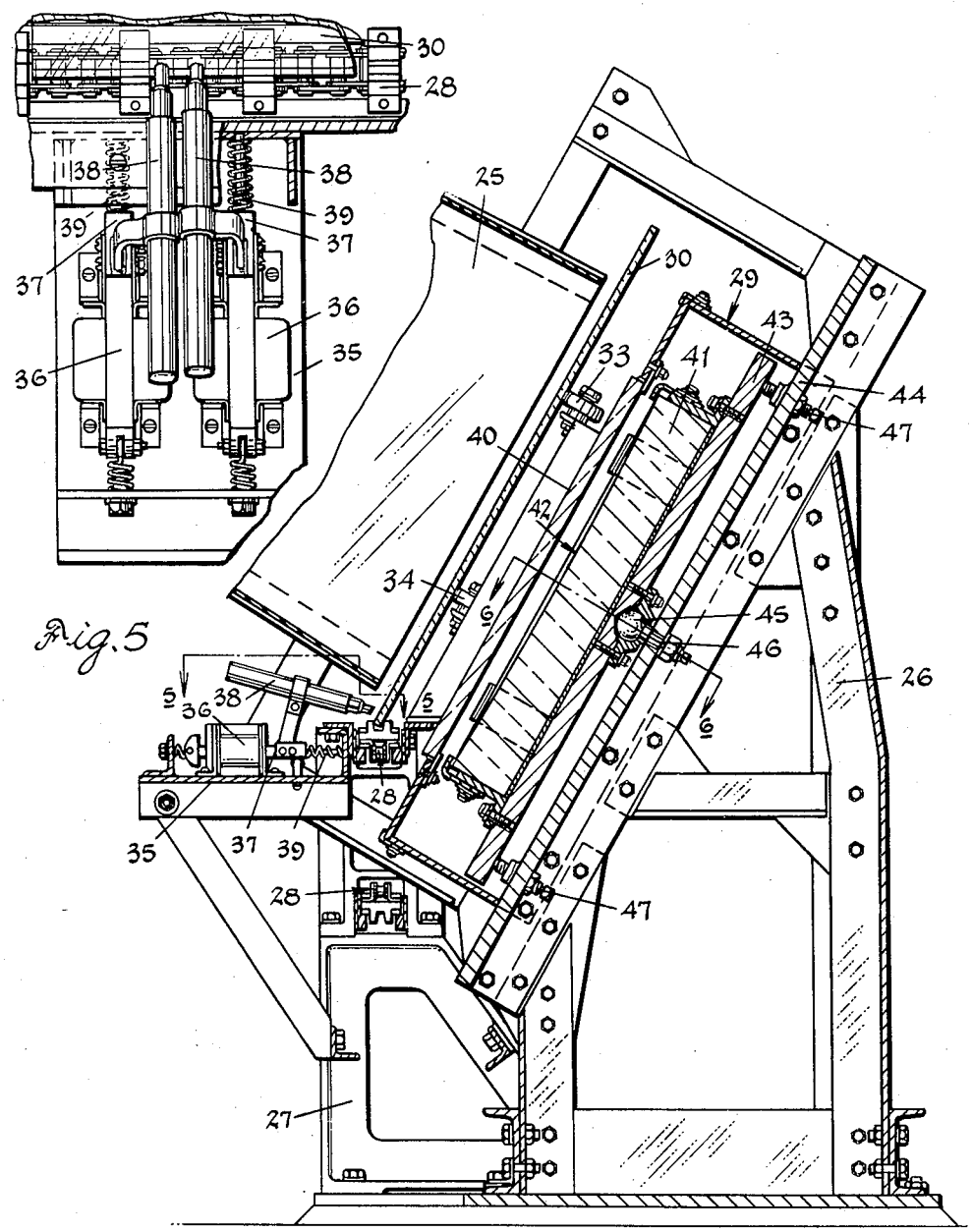
Fig. 4 is a vertical section taken perpendicular to the path of a conveyor and showing the relationship between the glass being inspected and the concave mirror.
Fig. 5 is a fragmentary plan as seen from the line 5—5 of Fig. 4 showing the structure arranged to mark the glass should it exhibit objectionable wedge.

According to the invention, a machine of the general nature disclosed in the above-mentioned Patent No. 2,735,331, issued February 21, 1956, is provided with means for intermittently interrupting or intercepting portions of deviated light rays caused by the effect of wedge, thereby differentiating them from scattered light produced by haze or surface film on the glass sheets to be inspected. This selective action upon the light beams deviated due to the non-parallelism of the glass sheet to be inspected is sensed and received by a photoelectric cell which transduces the intermittent light pulses into alternating current which is received by responsive means adapted to mark the glass sheets to be rejected.

With reference now to the drawings, the optical system of the invention is shown schematically in Fig. 1. As there shown, a light source 1, which preferably is a 50-candle power automobile lamp, illuminates a sheet of glass 2 to be inspected. The light rays, after passing through the sheet of glass, are reflected from a concave surface 3 of a mirror 4 so that the rays again pass through the glass sheet 2. The reflected rays, because of the curvature of the mirror, are brought to a focus on a small opaque screen 5 that serves to intercept all of the undeviated rays and which is centrally located on a rotatable beam-chopper 6 later described in detail. Thus, a light ray 7 proceeding from the light source toward the top edge of the glass sheet 2, as seen in the figure, passes through the glass and is reflected as a ray 8 that falls on the opaque screen 5. Likewise, a ray 9 from the light source 1 directed toward the lower portion of the glass sheet 2 is reflected as a ray 10 that also falls on the opaque screen 5. The precise position at which the rays 8 and 10 strike the opaque screen 5 depends upon the amount of deviation produced by the glass sheet 2. For the purpose of example, the glass sheet 2 may be assumed to have an area 11 exhibiting wedge so that a light ray 12 in passing through the area 11 is refracted downwardly slightly. This ray 12, after reflection from the mirror, returns through the wedged area 11 and is again refracted downwardly as a ray 13 that passes below the opaque screen 5 and through one of the rotating apertures 14 (Fig. 2) of the beam-chopper 6. After passing the beam-chopper, the deviated beam 13 passes through a lens 15 that serves to direct the ray to a light detecting device or photoelectric cell 16.

In this arrangement, it makes no difference which part of the area of the glass is defective as exhibiting wedge since the entire area is illuminated and since any deviated rays will pass the screen 5 and reach the detecting device 16.

Should it be desired to classify the glass according to the amount of wedge into more than merely acceptable and non-acceptable classes, extra light sources such as a light source 17 and extra beam-choppers such as a chopper 18 may be added. The centrally located screen on the chopper may be graduated in size and, as shown, the screen 19 on the chopper 18 is considerably larger than the screen 5 on chopper 6. Because of the difference in size, a considerably greater amount of wedge is required to deviate the rays far enough to pass the screen 19. Thus, the screen 5 may be of such area so as to intercept rays having an acceptable limit of deviation, while the screen 19 is larger and of sufficient size to intercept those rays passing through areas that have slightly more wedge than is acceptable for certain applications and yet which is acceptable in other applications. However, if the glass has an amount of wedge making it unacceptable for either use, the deviation is sufficient so that the light rays pass even the larger screen 19.

The possibility of a piece of glass having so much wedge that the light is deviated beyond the limits of the lens 15 or detecting device 16 has also been considered. However, this condition while it may exist in small areas of the glass will nevertheless not cause trouble because in the method of manufacturing of the glass it is impossible to have any discontinuities in the surface. Therefore, these small, excessively wedged areas are in all probability surrounded by areas having lesser amounts of wedge and these lesser amounts produce such deviation that the light reaches the detecting device thereby indicating that the piece of glass is defective.

Fig. 2 shows the chopper 6 with the image of the light source appearing as a sharply defined spot 20 on the screen 5 when the system is properly focused and there is no glass being tested. However, light rays reflected by surface film or haze on the glass sheet being inspected will cover the entire surface of the chopper and will not have a clearly defined area or location. If the glass sheet being tested is perfect, the definition and position of the spot 20 is not changed. If a small, precisely constant amount of wedge exists throughout the area of the glass, the spot 20 is deflected or displaced to a position 21 which may be on the edge of the screen if the amount of wedge corresponds to the critical amount or maximum tolerance for which the system is designed. If the wedge is still uniform but of greater amount and in the opposite direction, the spot 20 may be deflected to a position 22 that is entirely off the screen 5. This may still be within the limits of a larger screen such as the screen 19 cooperating with another light source and light detecting system. If, as is usually the case, sections of the glass sheet 2 exhibit wedge in various amounts, an irregularly shaped light spot 23 is formed which, for example, may have an outline as indicated with the greater portion of the light area on the screen 5 but having a small portion extending or spilling over the edge of the screen. This spreading and distortion of the spot 20 to form the distorted spot 23 results because each individual area of glass produces more or less deviation which may or may not correspond to that of other sections of glass and thus produces its own independent effect. The brilliancy of the various portions of the irregular area 23 may be used as a measure of the amount of defective area of glass. Thus, if only a very small part of the glass were bad but the amount of wedge in that small area is large enough to be objectionable, the pattern on the screen will be very bright near the center of the opaque screen and fading out toward the edge with only a very small amount of light passing into the detecting device.

It is to be understood that the shape of the irregular spot 23 is determined by the degree and direction of wedge in the various portions of the glass but not by the position or size of such areas. Thus, any device that is responsive only to the presence or absence of light passing the screens may sort the glass being inspected according to the maximum amount of wedge occurring in any small area of the glass but is otherwise not capable of directly indicating the location or extent of the defective areas and, as previously mentioned, may give erroneous results due to the effect of scattered light.

This improved method of inspecting glass sheets for areas exhibiting wedge may be employed in an automatic classifying machine which inspects the glass as it is carried along on a conveyor and marks those sheets of glass having more than a prescribed amount of its area exhibiting more than a critical amount of wedge. Such a machine is illustrated in Figs. 3 to 16 inclusive. Referring to Fig. 3, suitable light sources and light detecting devices are installed in a light-tight box 24 located at the upper end of an inclined tapered light shield 25 the lower end of which is supported on a framework 26 constructed independently of a second framework 27 carrying a conveyor 28. A mirror housing 29 is supported in the framework 26 and glass sheets 30 to be inspected are carried on the conveyor 28 through the space between the end of the light shield 25 and the mirror housing 29. The upper end of the light shield 25 is carried from stanchions 31, small compression springs 32 being employed to minimize the transmission of vibration to the housing 24.

Turning now to Fig. 4, which is an enlarged cross section through the mirror housing conveyor and lower end of the light tube, the conveyor includes a chain having a plurality of U-shaped rubber blocks that receive the lower edges of the glass sheets 30 being inspected. Two series of rubber tired rollers 33 and 34 arranged at different elevations along the conveyor 28 guide the glass sheets and hold them in position to be inspected as they pass through the apparatus. The conveyor framework 27 also includes a shelf 35 on which are mounted a pair of solenoids 36 having armatures 37 that actuate inking guns 38. The inking guns are normally held out of engagement with the glass by springs 39 but are urged into marking position whenever the solenoids 36 are energized. The solenoids are controlled by photoelectric means which are sensitive to light rays deviated by wedge shaped areas of the glass sheet 30.

The mirror housing 29 has, in its front wall facing the glass sheet 30, a partially masked clear glass window 40 that has been carefully inspected and found to be free from all traces of wedge or other optical defects. The clear area of the window is arranged to register with the area of the glass to be inspected. Within the housing 29, a large mirror 41 having a concave spherical face 42 is securely mounted on a heavy base plate 43 which in turn is adjustably mounted on a rigid structural member 44 of the framework 26. The mirror base 43 is rockably mounted on a ball and socket joint 45 and heavy bolt 46 secured in the rigid structural member 44. A plurality of adjustable posts 47 contacting the corners at the mirror base plate 43 and threaded through the rigid structural member 44 facilitate precise angular adjustment of the mirror 41 with respect to the light tube 25 and light source within the housing 24 (Fig. 3).

From inspection of Figs. 4 and 6, it will be noted that the mirror 41 is much longer in a direction transverse to the conveyor 28 than it is in a direction along the conveyor. This shape is selected since it is necessary that the mirror be long enough to span the height of the glass sheets as they are carried on the conveyor, but its width, i.e., its dimension along the travel of the conveyor, need be only great enough so that the photoelectric means and solenoids have time to act while a defective area of glass is being inspected. Thus, if the glass is moved very slowly the mirror may be very narrow, whereas if the glass is moved rapidly the width of the mirror must be correspondingly increased. This consideration determines the minimum width of the mirror while the cost of the mirror determines its maximum width.

The mirror face is preferably a portion of a spherical surface the center of curvature of which is located approximately in the center or slightly forward of the center of the housing 24 at the upper end of the light shield which housing encloses the light sources and light detecting apparatus. While the mirror theoretically should be a section of an ellipsoid to secure exact focusing when the light source and image are offset from the optical axis, the separation of the foci (the positions of the light source and its image) of the ellipsoid is so small that a spherical surface is entirely satisfactory.

The equipment housed within the light source housing 24 is illustrated in Figs. 8 to 15 inclusive. Referring to Fig. 8, the housing 24 is divided into an upper chamber 48 and a lower chamber 49, the light sources being mounted in the upper chamber 48 and the light detecting equipment being located in the lower chamber 49.

Figure 11:
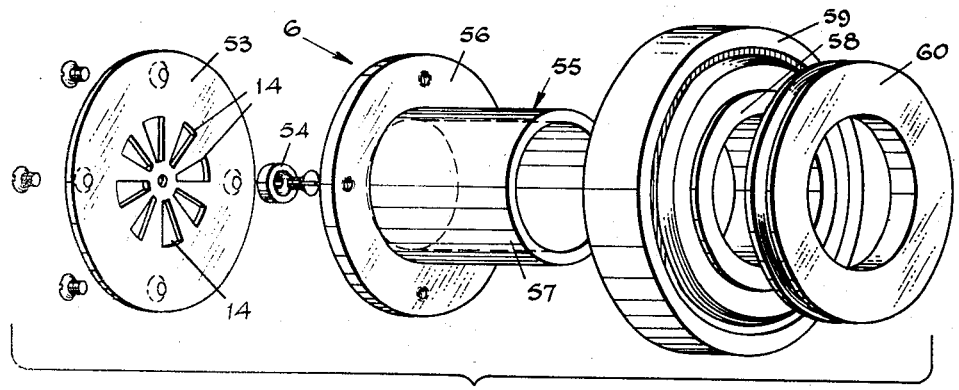
Fig. 11 is a perspective view of a light chopper and its allied components.

The light detecting equipment comprises one or more photoelectric cells 50 that are mounted behind a partition 51 so that they are completely darkened except for light that enters from the mirror 41 through the light shield tube 25 and lenses 52 covering openings in the partition 51. The lenses 52 correspond in function to the lens 15 of Fig. 1 while the photoelectric cells 50 correspond to the light detecting apparatus 16. The beam choppers 6 are positioned immediately ahead of the lenses 52 and, as shown in Fig. 11, include a disc-like chopping plate 53 having the apertures 14 extending radially outward from the center thereof and in surrounding relationship to an opaque center piece 54 formed from a circular bar and secured to the chopping plate at the center thereof. The plate 53 is supported by a rotatable sleeve 55 having a flange 56 at its one end to which the plate 53 is boltably secured and a hollow axial shaft 57 which is received within the inner race 58 of a bearing 59 mounted on the plate 51. The shaft 57 is rotated by means of a sheave 60 which, as seen in Fig. 9, is driven by a V-belt 61 actuated by a driving sheave 62 driven by a suitable electric motor 63.

As shown in Fig. 9, when it is desired to use two light sources and beam choppers, the choppers 6 are positioned side-by-side and the central opaque portions 54 and 64 thereof correspond to the screens 5 and 19 of Fig. 1.

The upper chamber 48 of the housing 24 contains a plurality of automobile lamps 65 each of which is supported in a saddle 66 and socket 67 attached to an individual mounting plate 68. The individual mounting plates 68, one for each light source 65, are keyed to and horizontally adjustable on intermediate plates 69, and these intermediate plates are in turn keyed to and vertically adjustable on a gang plate 70. In this construction a tongue in the mounting plate 68 engages a horizontal groove in the intermediate plate 69 and an eccentric stud 71 engaging a slot 72 (Fig. 9) serves to adjust the mounting plate 68 horizontally as may be required. A pair of clamps 73 when tightened lock the plates 68 to the intermediate plate 69. A similar arrangement employing a vertical tongue and groove connection as well as clamps serves to support the intermediate plate 69 from the gang plate 70.

The gang plate 70 is carried on a compound carriage arranged so that it might be adjusted along any of three axes. Thus, the gang plate 70 depends from and is rigidly attached to a slide 74 that is mounted for horizontal movement transversely of the optical axis of the system. Adjustment in this direction is controlled by a thumb wheel 75 the screw of which is journaled in a depending lug 76 of a horizontal intermediate plate 77 and threadedly engages a nut 78 attached to the slide 74. The intermediate plate 77 also carries an upwardly extending lug 79 to journal an adjusting screw 80 controlled by a thumb wheel 81. The adjusting screw 80 threadedly engages a nut 82 mounted on a shelf 83 of a vertically adjustable carriage 84. The two adjustments controlled by the thumb wheels 75 and 81 serve to adjust the position of the light sources in a horizontal plane, the thumb screw 75 serving to move the light sources horizontally and perpendicularly to the optical axis while the thumb wheel 81 moves them along the optical axis.

Referring to Fig. 15, a single clamp comprising a bolt 85 extending upwardly through a slot 86 in the slide 74, through a hole in the intermediate plate 77 and through a slot 87 in the shelf 83 is engaged by a clamping nut 88 having a handle 89. Thus, this one clamp serves to lock both horizontal motions.

The carriage 84 is carried on a vertical plate 90 being guided thereon by a tongue and groove joint 91 (Fig. 13). A clamp comprising a bolt 92 threaded into a handle 93 and engaging a nut 94 serves to hold the carriage 84 in whatever position it may be placed by an adjusting screw 95 and a thumb wheel 96.

These various adjustments allow the light source or light sources to be adjusted relative to each other as provided by the individual adjustment plates 63 and 69 and to be adjusted as a group by the adjusting screws thumb wheels 75, 81 and 96.

These adjustments are all required to secure a satisfactory operation of the device since it is necessary that, in the absence of a glass sheet to be inspected, the light from one of the light sources 65 shall be accurately focused on a corresponding opaque screen 54 or 64. Rough adjustment of spot position is obtained by means of the adjusting posts 47 that serve to tilt the mirror 41. Fine adjustment is obtained by moving the light sources horizontally or vertically by means of the thumb wheels 75 and 96 until the spot or spots are accurately located on the centers of the opaque screen or screens 54 or 64. If the spots are not sharply in focus, the light sources are moved toward or away from the mirror by manipulation of the adjusting knob 81. If, when one of the light spots is accurately focused and located on the center of its particular opaque screen, it is found that the other spot or spots are not centered, then the light sources producing such other spots are moved relative to the gang plate 70 by means of the individual adjustments until such spots are accurately centered. This latter adjustment is ordinarily not required except after replacement of a light source or light sources. When the light source system is in exact adjustment, the light sources are located substantially in line with each other and equally spaced along such line while the lenses 52 are by construction accurately spaced and aligned along a line in the mounting plate 68. The opaque screens are also centered on their respective lenses. Under this condition of adjustment the center of curvature of the mirror 41 is located halfway between the center of a light source and the center of the corresponding screen. Thus, in Fig. 9 light that is emitted by the left hand light source 65 is received on the small diameter opaque screen 64 located to the right of the vertical center line of the housing while light from the right hand light source is received on the opaque screen 54 to the left of the center line of the housing. Two or more light sources and corresponding photoelectric cells and lenses are employed whenever it is desired to classify the glass sheets according to the maximum degree of wedge existing in the glass and to establish more than two grades in the classification. Thus, one light source and photoelectric system is capable of dividing the glass according to the presence or absence of a prescribed degree of wedge while each additional light source and lens may subdivide the non-acceptable glass according to the actual amount of wedge present.

Figure 16:
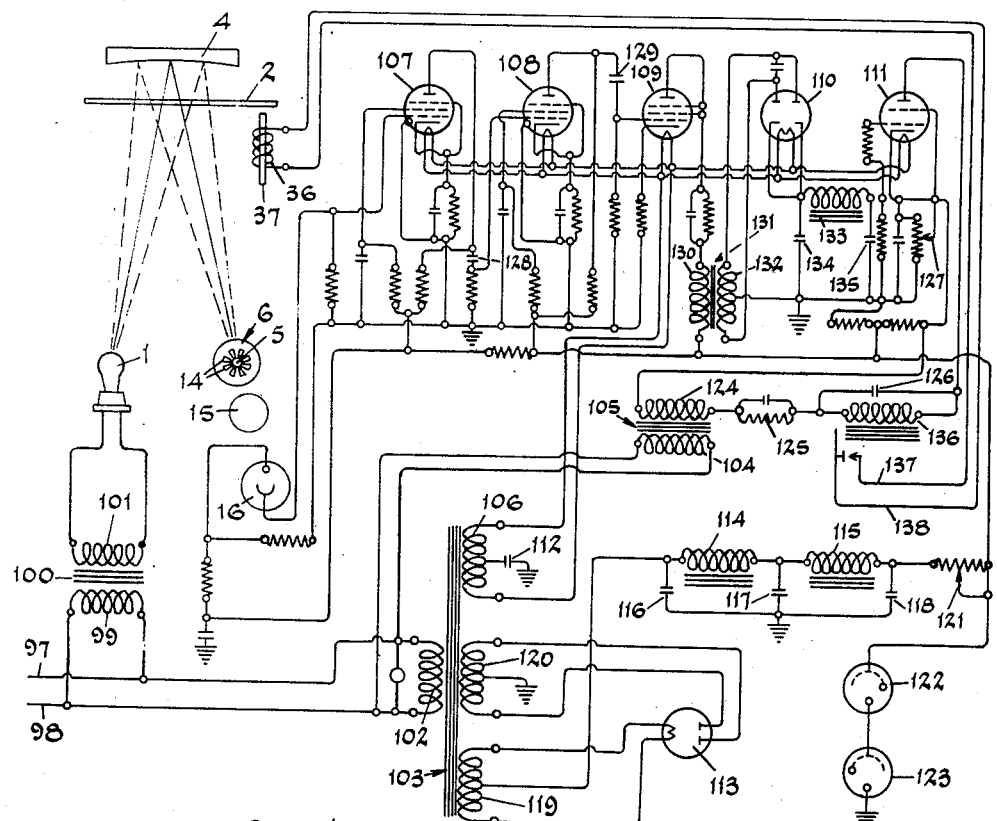
Fig. 16 is a schematic wiring diagram showing the photoelectric and electrical apparatus for detecting deviated light rays and controlling the ink brushes for marking defective glass.

In an apparatus employing a photoelectric cell such as one of the cells 50 as the light sensitive element, a very stable electronic amplifier is required to amplify the minute signals corresponding to the presence of light until such amplified signals are capable of actuating a relay for controlling the power to the marker solenoids 36 or to some other device for identifying or classifying the glass sheets. A schematic diagram of a suitable amplifier is illustrated in Fig. 16. This diagram shows a regulated power supply and one amplifier channel suitable for operating between one photoelectric cell and one marker solenoid. In the event that more photoelectric cells and light sources are employed, duplicate amplifier channels are required, and may all be energized from the same power supply.

The amplifier for the photoelectric cell 16 is supplied with alternating current through leads 97 and 98. The primary winding 99 of a step-down transformer 100 is connected across the leads 97 and 98 and the secondary winding 101 of the transformer is connected to the light source 1. The leads 97 and 98 supply the primary winding 102 of an isolation transformer 103 and also supply the primary winding 104 of a power transformer 105. The one secondary winding 106 of the power transformer supplies current to the heaters of amplifying tubes 107, 108 and 109, a full wave rectifier tube 110, a thyratron tube 111, and the center tap of the winding is connected to a condenser 112 before being grounded. The condenser 112 acts to isolate the heater of the thyratron tube 111 so as to prevent excessive cathode to heater potential difference and also effectively removes extraneous noise signals from the rest of the heater circuit. The plate circuits of these tubes along with the anode of the photoelectric cell 50 are supplied with a D.C. voltage from a rectifier and grounded filter circuit composed of a rectifier tube 113, and chokes 114 and 115 together with condensers 116, 117 and 118. The secondary winding 119 of the transformer 103 supplies the heater of the rectifier tube 113 and has its positive center tap connected to the filter circuit 114 etc. The grounded center tap of the secondary winding 120 provides the negative return for the filter circuit and the winding supplies the plates of the rectifier tube 113. A variable resistor 121 is connected to the output of the filter combination 114, 115 etc. to adjust the current through voltage regulator tubes 122 and 123 so that a normal amount of current is passing through these tubes which will then tend to keep the voltage constant at the plates of the amplifier tubes by changing internal resistance to compensate for voltage fluctuations.

The isolation transformer 105 has one terminal of its secondary winding 124 connected through a resistance-capacitance coupling 125 and condenser 126 to the anode of the thyratron tube 111. The other terminal of the secondary winding 124 is connected through a potentiometer 127 to the cathode of the thyratron.

In operation, the light source 1 directs a ray of light through the glass sheet 2 to be observed and this ray is reflected from the concave surfaced mirror 4 (Fig. 1) and directed toward the beam chopper 6. The beam chopper has the opaque center portion 5 thereof of such a size that a certain amount of wedge may be tolerated; that is, the cone of light will fall completely within the periphery of this center portion. When the amount of wedge becomes objectionable, the shape and size of the reflected beam will be such that it will fall outwardly off this central portion and the portions of the beam falling outwardly will be intermittently chopped or interrupted by the spaced apertures 14 of the beam chopper. The chopper 6 is rotated at a speed sufficient to produce 120-cycle impulses in the deviated interrupted beams which are focused by the lens 15 and fall upon the photocell which transduces them into electrical pulses.

It was previously mentioned that light, being reflected upon the beam chopper and occasioned by the presence of surface film or haze on the glass sheet, would not have a clearly defined area or shape but would instead cover the whole surface of the chopper. Therefore, the rotating apertures 14 of the beam chopper are unable to completely interrupt or intercept this scattered light which passes through the beam chopper and constantly falls upon the photocell. The photocell in turn differentiates between the pulsating signal produced by the uninterrupted or unintercepted portions of the deviated light rays and the constant weaker signal occasioned by surface film or haze and passes the pulsating signal into the vacuum tube amplifier.

The pulsating signal is passed by the photocell to the grid of tube 107 where it is amplified and removed from the tube plate circuit by passing through condenser 128 to the grid circuit of tube 108 where the signal is again amplified to a higher level, and then passes from the plate circuit of tube 108 through condenser 129 where the signal acts on the grid of tube 109. The signal is further amplified through tube 109 and acts on the primary winding 130 of a signal output transformer 131 connected in the tube 109 plate circuit. The transformer 131 steps up the output signal of the tube 109 and applies it to the plates of the rectifier tube 110 which is connected to the secondary winding 132 of the transformer 131. This alternating current signal is rectified by the tube 110 and converted to D.C. potential which is smoothed by a filter circuit comprising the choke 133 and the condensers 134 and 135. The varying D.C. potential thus smoothed is applied to the grid of the thyratron tube 111. The thyratron normally has a fixed negative bias condition on its grid, controlled in magnitude by the bias control 127. If the positive output signal overcomes this bias condition, the thyratron tube will fire and plate current supplied by the isolation transformer 105 will flow through a relay 136 thereby closing contact between the leads 137 and 138 which are connected to the solenoid 36 which operates the inking device. As long as the positive signal overrides the negative bias of the thyratron tube, the relay 136 will remain closed and the inking device will continue to mark the test sample of glass. As soon as a region in the glass shows up having parallelism within the accepted degree, the light beam from the point source will be reflected into the opaque portion of the beam chopper only. Therefore, there is no light beam to be chopped and a signal will no longer be directed to the amplifier and rectifier capable of overriding the negative bias of the thyratron tube. This tube will cease to fire and the relay will then open, thereby de-energizing the solenoid and the inking device will no longer be actuated.

Sensitivity of the circuit is maintained as high as possible consistent with stability, and the dividing line between an acceptable glass sheet and an unacceptable sheet is determined by the adjustment of the potentiometer 127 which as previously mentioned controls the magnitude of the negative signal impressed on the thyratron tube.

In an actual inspection machine constructed according to the invention, the sensitivity is such that an area of approximately one square inch out of a total inspected area of fifty to sixty square inches or more will cause a response and a marking of the glass.

The speed of response of the automatic inspecting equipment is sufficiently great that the limiting factor determining the rate of operation of the machine is the time required to load the glass sheets onto the conveyor and to remove the inspected sheets from the conveyor. A reasonable speed of conveyor operation may be in the order of three feet per second and at this speed an element of glass is in the inspecting zone approximately one-fifth to one-twentieth of a second. As far as the amplifier is concerned the limiting factor is that the defective area of the glass sheet must be within the inspecting zone two or three cycles of the supply voltage—approximately one-twentieth of a second—so that the relay 136 and the solenoid 36 may have time to operate.

Should it be desired to operate at a higher conveyor speed, the mirror 4 may be increased in width in the direction of travel of the glass so as to maintain approximately constant time interval during which each element of glass is in the inspection zone. It is also possible by the use of direct current on the relay system or by using a higher frequency power supply for the relay system to reduce the time interval required to energize the marker solenoid 36.

The improved inspection method and apparatus using the prismatic effect of wedged glass producing deviation of light rays and the selective interruptance thereof permits the economical and accurate inspection of glass to detect and identify those glass sheets which if installed as a window or windshield would produce annoying ghost images of light sources viewed through the glass.

It is to be understood that the form of the invention herewith shown and described is to be taken as a preferred embodiment of the same, and various changes may be resorted to without departing from the spirit of the invention or the scope of the subjoined claims.

We claim:

1. In apparatus for inspecting glass sheets for the presence of randomly located areas exhibiting wedge, in combination, means for conveying a glass sheet to be inspected along a definite path, light focusing means behind said conveying means, a point source of light in front of said conveying means for illuminating said focusing means, a screen of limited area located substantially at the image plane of said focusing means for receiving light rays that are substantially undeviated by a glass sheet on said conveying means, means for intermittently intercepting light rays that are deviated by said glass sheets, and means responsive to the intermittently intercepted deviated light rays for marking a glass sheet containing areas of wedge.

2. In apparatus for inspecting glass sheets for the presence of randomly located areas exhibiting wedge, in combination, a support for a glass sheet to be inspected, a point source of light in front of said support for transmitting a light beam through an area in the plane of a sheet to be inspected, means for receiving and focusing said transmitted light beam after it passes through said sheet, a screen substantially in the image plane of said focusing means for receiving light ray portions of said beam which deviate within accepted limits, means adjacent said screen for intermittently intercepting deviated light rays that do not fall on said screen, means for converting the intermittently intercepted light rays to electrical impulses, and means responsive to said electrical impulses for marking a glass sheet containing detected areas of wedge.

3. In apparatus for inspecting glass sheets for the presence of randomly located areas exhibiting wedge, in combination, a support for a glass sheet to be inspected, a point source of light in front of said support for transmitting a light beam through an area in the plane of a glass sheet to be placed on said support, light focusing means located behind the illuminated area of said sheet being inspected for forming a focused real image of the light source, a screen having a given area for receiving substantially undeviated portions of said light beam from said focusing means, movable means having apertures therein located adjacent said screen, said apertures being positioned outwardly of the periphery of said screen for intermittently intercepting deviated rays of said beam transmitted through areas of wedge and falling outwardly of said screen, means for converting the intermittently intercepted deviated rays into electrical impulses, and means responsive to said electrical impulses for marking a glass sheet containing detected areas of wedge.

4. In apparatus for inspecting glass sheets for the presence of randomly located areas exhibiting wedge, in combination, a support for a glass sheet to be inspected, a point source of light in front of said support for transmitting a light beam through an area in the plane of a glass sheet to be placed on said support, means located in the light path behind the glass being inspected for forming a focused real image of the light source, a screen positioned to receive the focused real image and having dimensions corresponding to said real image focused thereon as a result of an acceptable portion of wedge, means for intermittently intercepting deviated light rays falling outwardly of said screen as a result of an unacceptable degree of wedge, a photoelectric device behind said screen for detecting the intermittently intercepted deviated light rays, and means responsive to said photoelectric device for marking a glass sheet containing unacceptable areas of wedge.

5. In apparatus for inspecting glass sheets for the presence of randomly located areas exhibiting wedge, in combination, a support for a glass sheet to be inspected, a point source of light in front of said support for transmitting a light beam through an area in the plane of a glass sheet to be placed on said support, light focusing means located behind the illuminated area of said sheet being inspected for forming a focused real image of the light source, a screen having a given area for receiving substantially undeviated portions of said light beam from said focusing means, rotatable means having a plurality of apertures therein located adjacent said screen said apertures extending outwardly a limited distance beyond the periphery of said screen, means for rotating said rotatable means at a given rate of speed whereby said apertures intermittently intercept deviated light rays transmitted through areas of wedge and falling outwardly of said screen, a photoelectric device for converting the intermittently intercepted deviated rays into electrical impulses, and means responsive to said electrical impulses for marking a glass sheet containing detected areas of wedge.

6. In a method of inspecting glass sheets for the presence of randomly located areas exhibiting wedge, the steps of directing a beam of light through a glass sheet to be inspected, intercepting light rays of said beam that are not deviated beyond a predetermined degree, intermittently intercepting light rays of said beam that are deviated beyond the predetermined degree of deviation, and converting the intermittently intercepted light rays deviated beyond the acceptable degree into electrical impulses.

7. A method of inspecting glass sheets as defined in claim 6, wherein the deviated light rays have the portions thereof intercepted according to a predetermined cycle.

8. A method of inspecting glass sheets as defined in claim 7, wherein the intensity of the electrical impulses are measured to determine the amount of wedge in the glass sheet being inspected.

9. A method of inspecting glass sheets for the presence of randomly located areas exhibiting wedge whereby a marking device indicates the presence of wedge on a glass being inspected, comprising directing a beam of light through a glass sheet to be inspected, reflecting the beam again through the glass sheet, intercepting light rays of said beam that are not deviated beyond a predetermined degree, intermittently intercepting the light rays that are deviated beyond the predetermined degree of deviation, and converting the intermittently intercepted light rays that are deviated beyond the acceptable degree of deviation into electrical impulses whereby said marking device is actuated.

10. In apparatus for inspecting glass sheets for the presence of randomly located areas exhibiting wedge, in combination, a support for a glass sheet to be inspected, a point source of light in front of said support for transmitting a light beam through an area in the plane of a glass sheet to be placed on said support, light focusing means located behind the illuminated area of said sheet being inspected for forming a focused real image of the light source, a screen substantially in the image plane of said focusing means for receiving said light beam from said focusing means through acceptable areas of wedge, means adjacent said screen for intermittently intercepting deviated light rays that miss said screen, and means responsive to the intermittently intercepted deviated rays for marking a glass sheet containing detected unacceptable areas of wedge.

11. In apparatus for inspecting glass sheets for the presence of randomly located areas exhibiting wedge, in combination, means for conveying a glass sheet to be inspected along a definite path, light focusing means for directing light rays through said sheet as it moves along said path, a screen of limited area located substantially at the image plane of said focusing means for receiving substantially undeviated light rays that pass through acceptable areas of wedge, apertured beam chopping means mounted adjacent said screen for intermittently intercepting light rays that are deviated outwardly from the periphery of said screen by passing through unacceptable areas of wedge, photoelectric means positioned to be actuated by said intermittently intercepted deviated light rays, and means responsive to said photoelectric means for marking a glass sheet containing detected areas of wedge.

References Cited in the file of this patent

UNITED STATES PATENTS

| | | |
|---|---|---|
| 1,874,217 | Arberry | Aug. 30, 1932 |
| 1,979,722 | Zworykin | Nov. 6, 1934 |
| 2,246,906 | Viebahn et al. | June 24, 1941 |
| 2,735,331 | McMaster et al. | Feb. 21, 1956 |